US008989447B2

(12) United States Patent
Sezer

(10) Patent No.: US 8,989,447 B2
(45) Date of Patent: Mar. 24, 2015

(54) DYNAMIC FOCUS FOR COMPUTATIONAL IMAGING

(71) Applicant: Texas Instruments Incorporated, Dallas, TX (US)

(72) Inventor: Osman Gokhan Sezer, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 124 days.

(21) Appl. No.: 13/965,164

(22) Filed: Aug. 12, 2013

(65) Prior Publication Data

US 2014/0044314 A1 Feb. 13, 2014

Related U.S. Application Data

(60) Provisional application No. 61/682,446, filed on Aug. 13, 2012.

(51) Int. Cl.
*G06T 7/00* (2006.01)
(52) U.S. Cl.
CPC .............. *G06T 7/004* (2013.01); *G06T 7/0069* (2013.01); *G06T 2207/10016* (2013.01); *G06T 2207/20021* (2013.01)
USPC .......................................................... 382/106
(58) Field of Classification Search
USPC ................. 382/100, 106, 154, 254, 155, 286; 345/418, 422; 396/79–82
See application file for complete search history.

(56) References Cited

U.S. PATENT DOCUMENTS

| | | | | |
|---|---|---|---|---|
| 6,154,574 A * | 11/2000 | Paik et al. | ...... | 382/255 |
| 6,816,287 B1 * | 11/2004 | Sakaguchi | ...... | 358/474 |
| 7,881,551 B2 * | 2/2011 | Paik et al. | ...... | 382/260 |
| 8,428,390 B2 * | 4/2013 | Li et al. | ...... | 382/274 |
| 8,705,881 B2 * | 4/2014 | Wang et al. | ...... | 382/255 |
| 8,792,014 B2 * | 7/2014 | Watanabe | ...... | 348/222.1 |
| 2007/0236769 A1 * | 10/2007 | Zalevsky | ...... | 359/238 |
| 2008/0075379 A1 * | 3/2008 | Kido et al. | ...... | 382/254 |
| 2009/0136148 A1 * | 5/2009 | Lim et al. | ...... | 382/255 |
| 2009/0154823 A1 * | 6/2009 | Ben-Ezra et al. | ...... | 382/255 |
| 2010/0092086 A1 * | 4/2010 | Lei et al. | ...... | 382/173 |
| 2011/0064326 A1 * | 3/2011 | Zeng | ...... | 382/255 |
| 2011/0150353 A1 * | 6/2011 | Watanabe et al. | ...... | 382/255 |
| 2012/0076362 A1 | 3/2012 | Kane et al. | | |

(Continued)

OTHER PUBLICATIONS

"Circle of confusion", Wikipedia, pp. 1-6, available at http://en.wikipedia.org/wiki/Circle_of_confusion on Aug. 12, 2013.

(Continued)

*Primary Examiner* — Anand Bhatnagar
(74) *Attorney, Agent, or Firm* — Mirna Abyad; Frank D. Cimino

(57) ABSTRACT

A method for all-in-focus image reconstruction and depth map generation in an imaging device is provided that includes capturing a multi-focus image by the imaging device, partitioning the multi-focus image into a plurality of blocks, determining, for each block of the plurality of blocks, a best inverse multi-focus point spread function (PSF) for reconstructing original image intensity values in the block, wherein the best inverse multi-focus PSF is selected from a plurality of predetermined inverse multi-focus PSFs stored in a memory of the imaging device, and applying to each block of the plurality of blocks the best inverse multi-focus PSF determined for the block to reconstruct the all-in-focus image.

9 Claims, 4 Drawing Sheets

(56) References Cited

U.S. PATENT DOCUMENTS

2013/0063566 A1 3/2013 Morgan-Mar et al.
2013/0113984 A1 5/2013 Shimamoto et al.

OTHER PUBLICATIONS

G. Cristobal and S. Gabarda, "No-reference (N-R) Image Quality Metrics", Instituto de Optica (CSIC), pp. 1-17, Mar. 10-11, 2011, Lisbon, Portugal.
Junlan Yang and Dan Schonfeld, "Virtual Focus and Depth Estimation From Defocused Video Sequences", IEEE Transactions on Image Processing, vol. 19, No. 3, pp. 668-679, Mar. 2010.
Murali Subbarao and Tse-Chung Wei, "Depth from Defocus and Rapid Autofocusing: A Practical Approach", Proceedings of the IEEE Computer Society Conference on Computer Vision and Pattern Recognition, Champaign, Illinois, pp. 773-776, Jun. 1992.
Murali Subbarao and Jenn-Kwei Tyani, "Noise Sensitivity Analysis of Depth-from-Defocus by a Spatial-Domain Approach", SPIE Proceedings, vol. 3174, pp. 174-187, Jul. 7, 1997.
Masahiro Watanabe and Shree K. Nayar, "Rational Filters for Passive Depth from Defocus", International Journal of Computer Vision, vol. 27, Issue 3, pp. 203-225, May 1998.
Xinyu Huang et al, "Image Deblurring for Less Intrusive Iris Capture", 2009 IEEE Conference on Computer Vision and Pattern Recognition, pp. 1558-1565, Jun. 20-25, 2009, Miami, Florida.
Vinay P. Namboodiri and Subhasis Chaudhuri, "Recovery of Relative Depth from a Single Observation using an Uncalibrated (Real-Aperture) Camera", 2008 IEEE Conference on Computer Vision and Pattern Recognition, pp. 1-6, Jun. 23-28, 2008, Anchorage, Alaska.
Xing Lin et al, "Coded Focal Stack Photography", International Conference on Computational Photography (ICCP), pp. 1-9, Apr. 19-21, 2013, Cambridge, Massachusetts.
Masahiro Watanabe and Shree K. Nayar, "Telecentric Optics for Focus Analysis", IEEE Transactions on Pattern Analysis and Machine Intelligence, vol. 19, No. 12, pp. 1360-1365, Dec. 1997.

* cited by examiner

FIG. 3
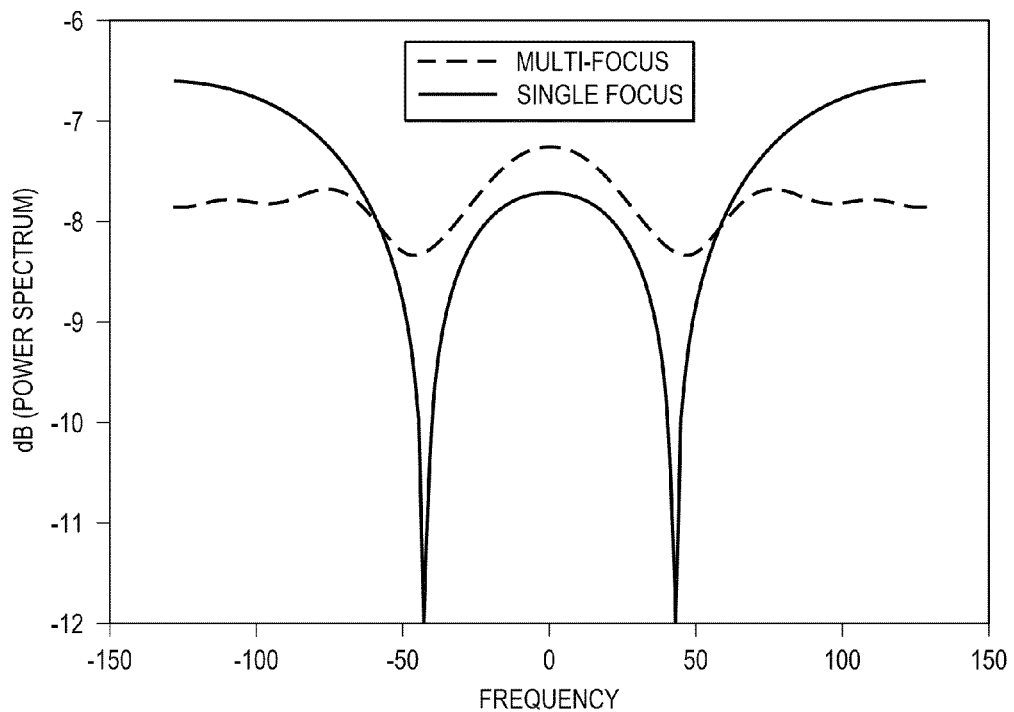
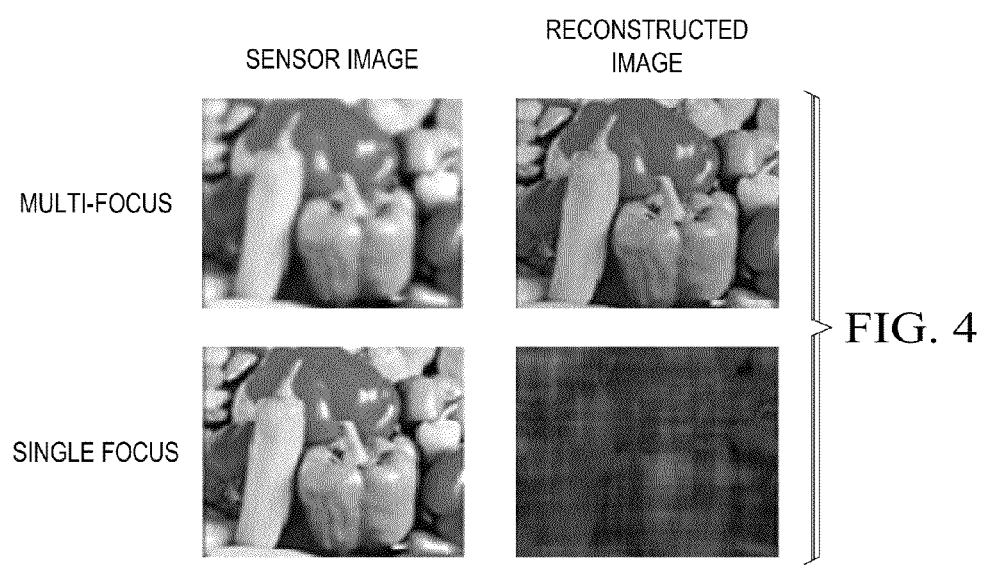
FIG. 4

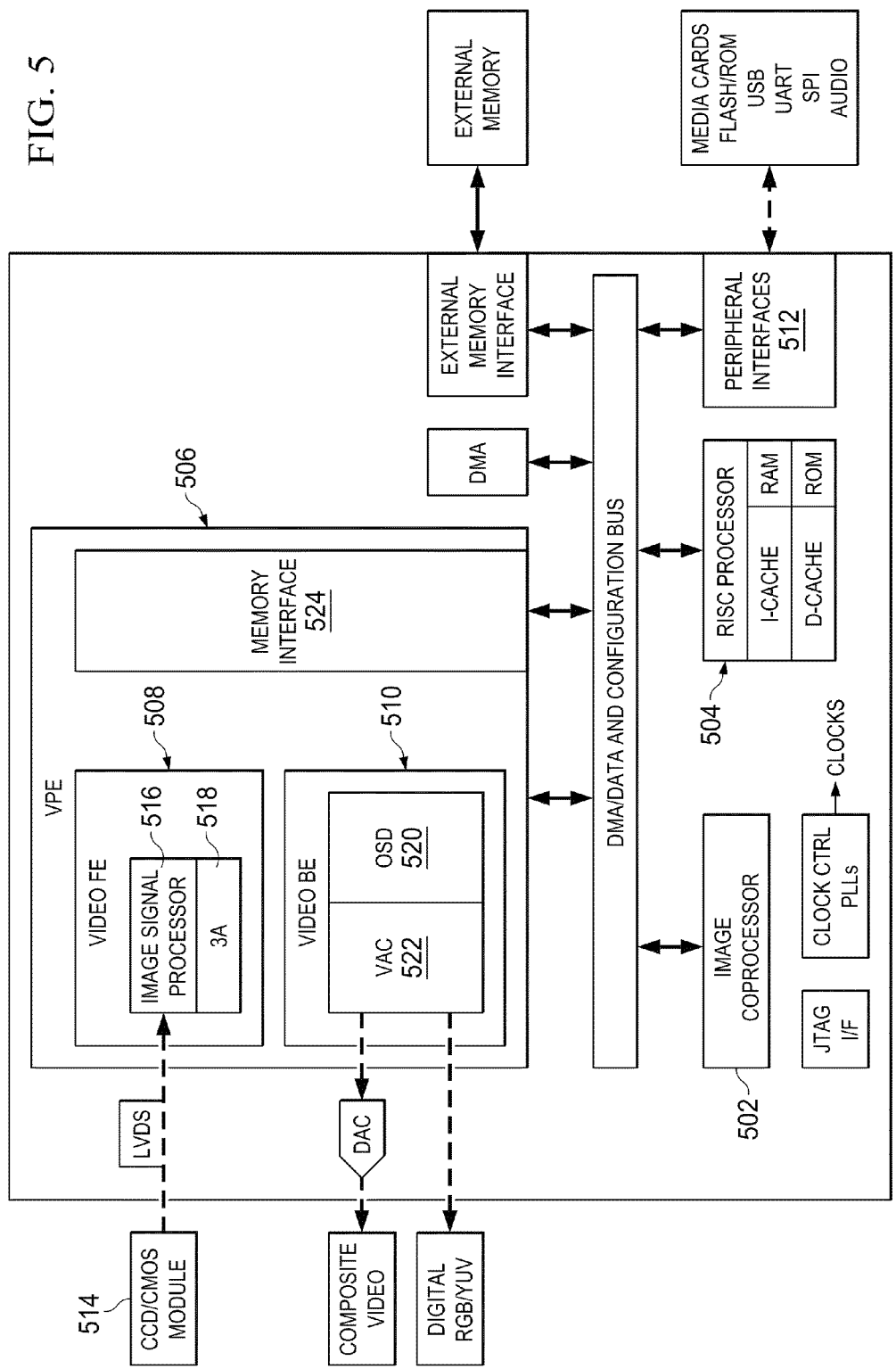

DYNAMIC FOCUS FOR COMPUTATIONAL IMAGING

CROSS-REFERENCE TO RELATED APPLICATIONS

This application claims benefit of U.S. Provisional Patent Application Ser. No. 61/682,446, filed Aug. 13, 2012, which is incorporated by reference herein in its entirety.

BACKGROUND OF THE INVENTION

1. Field of the Invention

Embodiments of the present invention generally relate to generating an all-in-focus image and constructing a depth map of a scene from a single image.

2. Description of the Related Art

In computer vision and other imaging based applications, the distance from the point of image capture to objects in the scene being captured is important information. This distance or depth to objects is generally communicated in form of a depth map. Further, it is particularly desirable in many applications to be able to determine scene depth using a single camera.

There are several known techniques in the art for determining a depth map using a single camera. One particular class of techniques uses multiple images captured by a single camera from a single viewpoint to determine a depth map. Such techniques may be classified as either depth from focus (DFF) techniques or depth from defocus (DFD) techniques. In general, DFF techniques use multiple images of a scene captured at different focus positions. Image patches of each image are analyzed to find the image with the best focus position for an object in a particular image patch. The depth of the object can then be determined using the well-known lens formula. The requirement for multiple images may result in long capture times and long processing times, and requires sufficient memory to store the multiple images until processing is complete.

In general, DFD techniques use a small number of images (typically less than DFF techniques) of a scene captured using differing parameters such as focus or aperture. The images are analyzed to determine the difference in the amount of blurring in objects in the scene. A measure of the blur differences is then used to determine the depths of the objects. Various techniques for relating a measure of blur difference to depth have been proposed. Some DFD techniques use as few as two images. DFD techniques may be prone to error, for example, due to small amount of data used (as compared to DFF techniques), any movement in the scene and/or of the camera between image captures, and the complex relationship between blur and object distance.

SUMMARY

Embodiments of the present invention relate to generating an all-in-focus image and constructing a depth map of a scene from a single image. In one aspect, a method for all-in-focus image reconstruction and depth map generation in an imaging device is provided that includes capturing a multi-focus image by the imaging device, partitioning the multi-focus image into a plurality of blocks, determining, for each block of the plurality of blocks, a best inverse multi-focus point spread function (PSF) for reconstructing original image intensity values in the block, wherein the best inverse multi-focus PSF is selected from a plurality of predetermined inverse multi-focus PSFs stored in a memory of the imaging device, and applying to each block of the plurality of blocks the best inverse multi-focus PSF determined for the block to reconstruct the all-in-focus image.

In one aspect, an imaging device is provided that includes means for capturing a multi-focus image, means for partitioning the multi-focus image into a plurality of blocks, means for determining, for each block of the plurality of blocks, a best inverse multi-focus point spread function (PSF) for reconstructing original image intensity values in the block, wherein the best inverse multi-focus PSF is selected from a plurality of predetermined inverse multi-focus PSFs stored in a memory of the imaging device, and means for applying to each block of the plurality of blocks the best inverse multi-focus PSF determined for the block to reconstruct the all-in-focus image.

In one aspect, a non-transitory computer readable medium is provided that stores instructions that, when executed by at least one processor, cause the execution of a method for all-in-focus image reconstruction and depth map generation in an imaging device, the method including capturing a multi-focus image by the imaging device, partitioning the multi-focus image into a plurality of blocks, determining, for each block of the plurality of blocks, a best inverse multi-focus point spread function (PSF) for reconstructing original image intensity values in the block, wherein the best inverse multi-focus PSF is selected from a plurality of predetermined inverse multi-focus PSFs stored in a memory of the imaging device, and applying to each block of the plurality of blocks the best inverse multi-focus PSF determined for the block to reconstruct the all-in-focus image.

BRIEF DESCRIPTION OF THE DRAWINGS

Particular embodiments in accordance with the invention will now be described, by way of example only, and with reference to the accompanying drawings:

FIG. 3 is a graph;
FIG. 4 is an example;
and
FIG. 5 is a block diagram of an illustrative digital system.

DETAILED DESCRIPTION OF EMBODIMENTS OF THE INVENTION

Figure 1:
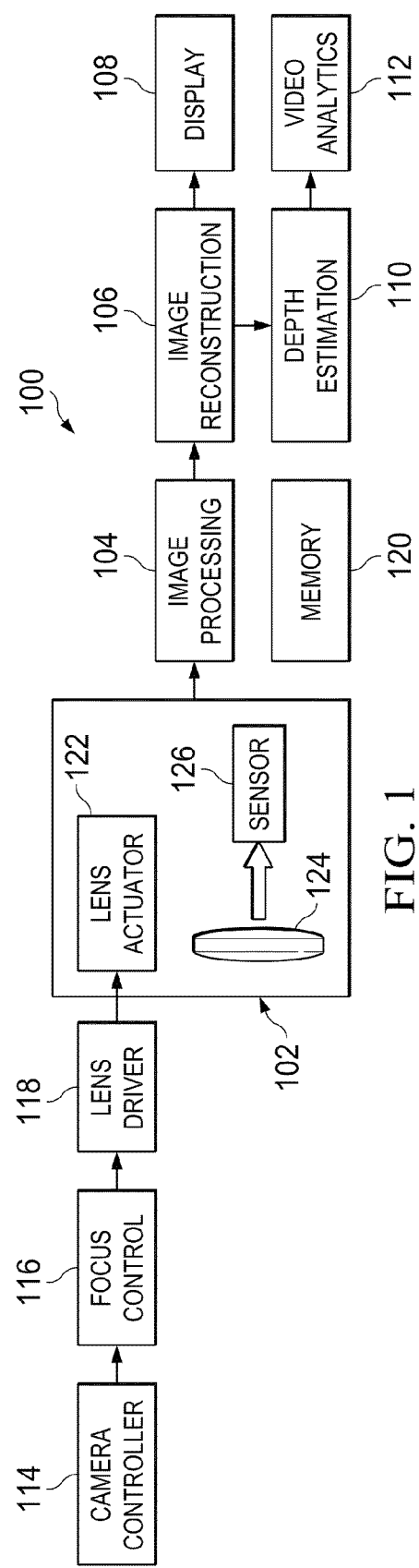
FIG. 1 is a block diagram of an example imaging device.

Specific embodiments of the invention will now be described in detail with reference to the accompanying figures. Like elements in the various figures are denoted by like reference numerals for consistency.

In contrast to prior art techniques that require multiple images, embodiments of the invention use a single multi-focus image to generate an all-in-focus image and to construct a depth map of the scene. Because a single image is used, the memory requirements and the overall complexity of the depth determination is reduced as compared to prior art techniques that use multiple images.

FIG. 1 shows a simplified block diagram of an example imaging device 100 configured to generate an all-in-focus image and to construct a depth map from a single multi-focus image. More specifically, the imaging device 100 may be configured to perform an embodiment of a method for image focus and depth map generation as described in reference to FIG. 2. A multi-focus image (frame) is an image captured in a single exposure (shutter cycle) in which the lens is moved to multiple focus positions. More specifically, a multi-focus image is generated by opening the shutter to initiate image capture, moving the lens to each of multiple focus positions (f-stops) while photons are accumulated on the imaging sensor, and closing the shutter to terminate image capture after the lens has been moved to each of the focus positions.

The imaging device 100 includes an imaging component 102, an image processing component 104, an image reconstruction component 106, a display 108, a depth estimation component 110, a video analytics component 112, a camera controller component 114, a focus control component 116, a lens driver 118, and a memory component 120.

The imaging component 102 includes a lens assembly 124, a lens actuator 122, and an imaging sensor 126. In some embodiments, the lens assembly 124 includes a telecentric lens. A telecentric lens is a compound lens which has its entrance or exit pupil at infinity. In some embodiments, telecentricity is achieved by changing the location of the aperture, i.e., by adding an aperture to a conventional lens. See, for example, M. Watanabe and S. Nayar, "Telecentric Optics for Focus Analysis," IEEE Transaction on Pattern Analysis and Machine Intelligence, Vol. 19, No. 12, December, 1997, pp. 1360-1365. In some embodiments, the lens assembly 124 may be any suitable lens assembly and the imaging device 100 includes functionality to convert captured multi-focus images to telecentric multi-focus images. For example, a lens assembly may include a zoom lens and a focus lens. Any suitable technique may be used to convert a multi-focus image to a telecentric multi-focus image. The lens actuator 122 may be any suitable actuator technology that supports movement of the lens assembly 124 to change the focus position of a lens as directed by the lens driver 118. The imaging sensor 126 may be any suitable imaging sensor such as, for example, a CMOS (Complementary Metal-Oxide Semiconductor) or CCD (Charge Coupled Device) imaging sensor. The imaging component 102 also includes circuitry for controlling various aspects of the operation of the component, such as, for example, aperture opening amount, exposure time, etc. The imaging component 102 further includes functionality to convert the analog image signals to digital image signals and to provide the digital image signals to the image processing component 104.

The image processing component 104 receives the digital image signals sequentially, divides the digital signals into frames, and processes each frame to enhance the scene in the frame. The image processing performed may include one or more image enhancement techniques such as, for example, black clamping, fault pixel correction, color filter array (CFA) interpolation, gamma correction, white balancing, color space conversion, and edge enhancement. The processed frames are provided to the image reconstruction component 106.

The image reconstruction component 106 includes functionality to generate all-in-focus images from multi-focus frames provided by the image processing component 104 and to provide the all-in-focus images to the display 108. More specifically, the image reconstruction component 106 includes functionality to divide a multi-focus frame (image) received from the image processing component 104 into blocks, to determine a best reconstruction function for each block, and to reconstruct the all-in-focus image from the multi-focus image by applying the selected reconstruction functions to the blocks. The image reconstruction function 106 also includes functionality to indicate the reconstruction function selected for each block of the multi-focus to the depth estimation component 110. The functionality of the image reconstruction component 106 is explained in more detail in reference to the method of FIG. 2.

The display 108 is may be any suitable display device such as, for example, a liquid crystal display (LCD) device, a touch screen, etc.

The depth estimation component 110 includes functionality to generate a depth map for the all-in-focus images generated by the image reconstruction component 106 and to provide the depth maps to the video analytics component 112. More specifically, the depth estimation component 110 derives a depth map for an all-in-focus image based on the reconstruction functions selected for each block of the corresponding multi-focus image. As is explained in more detail herein, each reconstruction function has an associated depth. The functionality of the depth estimation component 110 is explained in more detail in reference to the method of FIG. 2.

The video analytics component 112 analyzes the content of frames of the captured video stream to detect and determine temporal events not based on a single frame. The analysis capabilities of the video analytics component 112 may vary in embodiments depending on such factors as the processing capability of the imaging device 100, the particular application for which the imaging device 100 is being used, etc. For example, the analysis capabilities may range from video motion detection in which motion is detected with respect to a fixed background model to people counting, detection of objects crossing lines or areas of interest, vehicle license plate recognition, object tracking, facial recognition, automatically analyzing and tagging objects in a scene, activating alarms, etc. The video analytics component 112 used the depth maps generated by the depth estimation component 110 to facilitate at least some of the analysis tasks.

The camera controller component 114 controls the overall functioning of the imaging device 100. For example, the camera controller component 114 includes functionality to direct the focus control component 116 to generate multi-focus images using pre-determined focus positions stored by the memory component 120. In some embodiments, the camera controller component 114 includes functionality to train the imaging device 100 to learn reconstruction functions and associated depths for performance of an embodiment of the method of FIG. 2.

The focus control component 116 includes functionality to cause the lens driver 118 to move the lens assembly to focus positions provided by the camera controller 114. More specifically, the focus control component 116 includes functionality to cause the imaging component 102 to capture a multi-focus image using focus positions provide by the camera controller 114.

The lens driver 118 is operable to control the lens actuator 122 to cause the lens assembly 124 to move to focus positions specified by the focus control component 116. As will be apparent from the method description herein, the focus control component 116 communicates desired focus positions to the lens driver 118 during the capture of multi-focus images (frames).

The memory component 120 may be on-chip memory, external memory, or a combination thereof. Any suitable memory design may be used. For example, the memory component 120 may include static random access memory (SRAM), dynamic random access memory (DRAM), synchronous DRAM (SDRAM), read-only memory (ROM), flash memory, a combination thereof, or the like. Various components in the imaging device 100 may store information in memory in the memory component 120 as a video stream or individual images are processed. Further, the reconstruction functions, associated depths, and other parameters for generating all-in-focus images and depth maps from multi-focus images may be stored by the memory component 120.

Components of the imaging device 100 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Further, any software instructions may be stored in memory in the imaging device 100 and executed by one or more processors. The software instructions may be initially stored in a computer-readable medium such as a compact disc (CD), a diskette, a tape, a file, memory, or any other computer readable storage device and loaded and stored on the imaging device 100. In some cases, the software instructions may also be sold in a computer program product, which includes the computer-readable medium and packaging materials for the computer-readable medium. In some cases, the software instructions may be distributed to the imaging device 100 via removable computer readable media (e.g., floppy disk, optical disk, flash memory, USB key), via a transmission path from computer readable media on another computer system (e.g., a server), etc.

Figure 2:
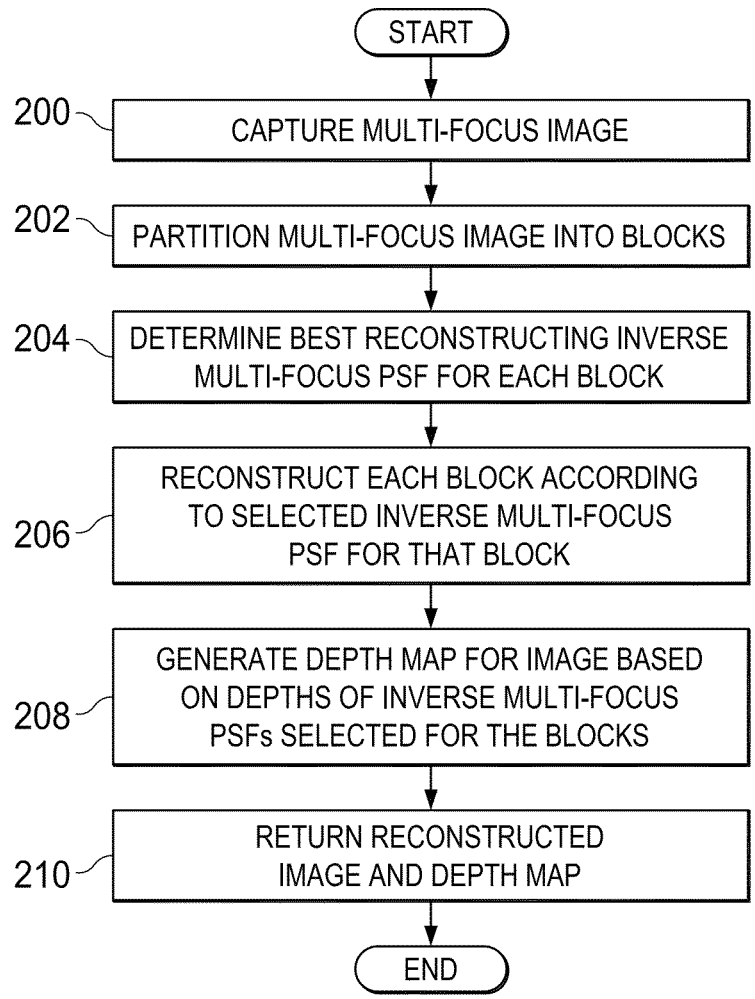
FIG. 2 is a flow diagram of a method.

FIG. 2 is a flow diagram of a method for generating an all-in-focus image and a depth map for that image from a single multi-focus image. This method may be performed by the imaging device 100 of FIG. 1 and is explained using the particular components of the imaging device 100 merely for illustration. As will be apparent to one of ordinary skill in the art having benefit of the disclosure provided herein, embodiments of the method can be implemented in other devices and using other components.

The method assumes that a number of inverse multi-focus point spread functions (PSFs), each having an associated depth, have been predetermined for the imaging device 100. Any suitable number of inverse multi-focus PSFs may be used. The number of inverse multi-focus PSFs used is implementation dependent and may be depend, for example, on criteria such as the computational bandwidth of the imaging device and the desired accuracy of the resulting depth map.

A PSF of an imaging device describes the image intensity caused by single point light source. Geometric optics approximates a PSF to a circular disk, referred to as the circle of confusion. A circle of confusion, also referred to as disk of confusion, circle of indistinctness, blur circle, or blur spot, is an optical spot caused by a cone of light rays from a lens not coming to a perfect focus when imaging a point source. Thus, a PSF represents the blur that a camera lens introduces. Further, a PSF is determined by focus position (focal length and aperture) and object depth and may be approximated as a Gaussian for mathematical simplicity. Thus, there is a distinct PSF for a given focus position and object depth.

In some embodiments, the predetermined inverse multi-focus PSFs and associated depths may be determined offline and stored in the memory component 120. In general, a multi-focus PSF is determined for each of a number of depths, and then the inverse of each of the multi-focus PSFs is determined. As is well-known, the circle of confusion (blur spot) can be mathematically determined. The mathematical determination is described, for example, in the section with the title "Determining a circle of confusion diameter from the object field" in the Wikipedia entry "Circle of confusion" available at http://en.wikipedia.org/wiki/Circle_of_confusion. The distance can be changed multiple times to get the multi-focus blur (multi-focus PSF). The inverse of the multi-focus PSF is given by Ih=IFFT(I/FFT(h)) where I is an array of ones and h is the multi-focus PSF.

In some embodiments, the inverse multi-focus PSFs and associated depths are predetermined by training performed with the imaging device 100. That is, the imaging device 100 may be place in a training mode to "learn" inverse multi-focus PSFs at different desired depths. For example, a single point such as a bright spot may be placed at a desired depth. The imaging device 100 may then change the focus to each of the focus positions while the shutter is open. The resulting blur is the multi-focus PSF and can be mathematically determined as previously described, as can the inverse multi-focus PSF. This process is repeated for each desired depth and the inverse multi-focus PSF and associated depths are stored in the memory component 120.

In contrast to single focus PSFs, a multi-focus PSF results in a depth dependent blur that is easily invertible to recover original image intensities (intensity values once an imaging device is focused on an object of interest) due to the spectral characteristics of the multi-focus PSF. The graph of FIG. 3 illustrates the power spectra of multi-focus and single focus PSFs. Note that the single focus PSFs have zeros which make them difficult to invert in noisy images.

Referring now to FIG. 2, initially, a multi-focus image is captured by the imaging component 102. More specifically, the camera controller component 114 directs the focus control component 116 to cause the capture of the multi-focus image using a number of pre-determined focus positions. The number of focus positions used in the multi-focus image capture may be implementation dependent and may be determined empirically for a given imaging device. For example, more focus positions may be used for an imaging device with higher lens position change speed while few focus positions may be used for an imaging device with a lower speed for changing lens positions. Note that increasing the number of focus positions used may improve the invertibility of the resulting multi-focus image, thus resulting in a better all-in-focus image.

The predetermined focus positions for capture of a multi-focus image may be stored in the memory component 120. Note that the predetermined focus positions are the same as those used to determine the inverse multi-focus PSFs. The multi-focus image is captured in a single exposure in which the lens is moved to each of the predetermined focus positions by the lens driver 118 as directed by the focus control component 116. Although not specifically shown, imaging processing may be performed on the multi-focus image to enhance the image.

The multi-focus image is then partitioned into blocks 202 by the image reconstruction component 106 and a best reconstructing inverse multi-focus PSF is determined 204 for each block. Any suitable block size may be used. Further, in some embodiments, the blocks may be overlapping. The particular block size to be used may be determined empirically for a given imaging device and stored in the memory component 120. In general, the block size may be chosen based on the size of the multi-focus blur, i.e., the size of the blur may determine the block size to be used.

To determine a best reconstructing inverse multi-focus PSF for a block, the image reconstruction component 106 applies each of the predetermined inverse multi-focus PSFs to the block and the one that provides the best reconstruction of the original image intensities of the block is selected. For example, assuming that the FFT of a block is F, and the FFT of the inverse blur is IH, the reconstructed block b can be found by b=IFFT(PH). Any suitable technique for deciding which of the inverse multi-focus PSFs is best may be used. For example, the inverse multi-focus PSF yielding the best peak signal-to-noise ratio (PSNR) may be selected. In another example, the result of applying an inverse multi-focus PSF to a block may be compared to a corresponding block in an all-focus image and the one providing the result closest to the all-focus block may be selected. The all-focus image may be captured when the multi-focus image is captured (either immediately before or after) by capturing an image using the smallest aperture size of the lens assembly 124. Examples of some suitable metrics that may be used are described in G. Cristobal and S. Gabarda, "No-reference (N-R) Image Quality Metrics", Instituto de Optica (CSIC), pp. 1-17, Mar. 10-11, 2011, Lisbon, Portugal.

Once the best reconstructing inverse multi-focus PSF is determined for each block, the image reconstruction component 106 reconstructs 206 the original image intensities in each block by applying the selected inverse multi-focus PSFs to the blocks. The result is the desired all-in-focus image.

A depth map 208 is also generated by the depth estimation component 110 for the all-in-focus image based on the inverse multi-focus PSFs selected for the blocks of the multi-focus image. As was previously mentioned, each of the multi-focus PSFs has an associated depth. Thus, the depth for each block of the all-in-focus image is the associated depth of the inverse multi-focus PSF used to reconstruct that block. These depths may then be used to generate a depth map for the image. Any suitable technique may be used.

The reconstructed image, i.e., the all-in-focus image, and the depth map are then returned for further processing in the imaging device 100. For example, the all-in-focus image may be display on the display 108 and the depth map may be used by the video analytics component 112.

FIG. 4 shows an example comparing the results of generating a reconstructed image using single focus PSFs and generating a reconstructed image according to the above method. The left two images are the original multi-focus image and single focus image captured by the imaging sensor and the right two images show the corresponding reconstructed images generated by applying inverse PSFs. Note that the reconstructed single focus image is poor because the blurs (single focus PSFs) of such an image are not well conditioned to be easily inverted.

FIG. 5 shows an illustrative digital system 500 suitable for use as an embedded system, e.g., in a digital camera or a cellular telephone, in accordance with one or more embodiments. The digital system 500 includes, among other components, an image coprocessor (ICP) 502, a RISC processor 504, and a video processing engine (VPE) 506 that may be configured to perform an embodiment of the method of FIG. 2. The digital system 500 also includes an interface for a display 520, an external memory interface 526, and peripheral interfaces 512 for various peripherals that may include a multi-media card, an audio serial port, a Universal Serial Bus (USB) controller, a serial port interface, etc.

The RISC processor 504 may be any suitably configured RISC processor. The ICP 502 may be, for example, a digital signal processor (DSP) or other processor designed to accelerate image processing. Some or all of the computational operations of the method of FIG. 2 may be performed by the RISC processor 504 and/or the ICP 502. That is, one or both of the processors may execute software instructions as part of performing the method.

The VPE 506 includes a configurable video processing front-end (Video FE) 508 input interface used for image capture from an imaging module 514, a configurable video processing back-end (Video BE) 510 output interface for display devices, and a memory interface 524 shared by the Video FE 508 and the Video BE 510. The imaging module 514 may be an imaging component 102 as previously described herein in reference to FIG. 1.

The Video FE 508 includes functionality to cause the imaging module 514 to capture multi-focus images. The Video FE 508 also includes functionality to perform image enhancement techniques on raw image data of the multi-focus from the imaging module 514. The image enhancement techniques may include, for example, black clamping, fault pixel correction, color filter array (CFA) interpolation, gamma correction, white balancing, color space conversion, and edge enhancement.

The Video FE 508 includes an image signal processor (ISP) 516, and an H3A statistic generator 3A) 518. The ISP 516 is customizable for various imaging sensor types, e.g., CCD or CMOS, and supports video frame rates for preview displays of captured images and for video and still image recording modes. The ISP 516 includes, among other functionality, an image resizer, and a boundary signal calculator. The ISP 516 also includes functionality to perform the determination of the best inverse multi-focus reconstructing PSFs for blocks of a multi-focus image, to apply these inverse multi-focus PSFs to the blocks to generate an all-in-focus image, and to generate a depth map for the all-in-focus image. The 3A statistics module 518 includes functionality to support control loops for auto focus, auto white balance, and auto exposure by collecting metrics on the raw image data from the ISP 516 or external memory 522.

The Video BE 510 includes functionality to manage display data in various formats for several different types of display devices, and to format display data into the output format and output signals required to interface to various display devices.

The memory interface 524 functions as the primary source and sink to modules in the Video FE 508 and the Video BE 510 that are requesting and/or transferring data to/from external memory 522. The memory interface 524 includes read and write buffers and arbitration logic.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein. For example, one of ordinary skill in the art will understand the depth map and the all-in-focus image may be used to generate one or more new images that have a desired object or objects in focus, i.e., that the information may be used for refocusing.

Embodiments of the automatic focus methods described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope of the invention.

What is claimed is:

1. A method for all-in-focus image reconstruction and depth map generation in an imaging device, the method comprising:
    capturing a multi-focus image by the imaging device;
    partitioning the multi-focus image into a plurality of blocks;
    determining, for each block of the plurality of blocks, a best inverse multi-focus point spread function (PSF) for reconstructing original image intensity values in the block, wherein the best inverse multi-focus PSF is selected from a plurality of predetermined inverse multi-focus PSFs stored in a memory of the imaging device; and
    applying to each block of the plurality of blocks the best inverse multi-focus PSF determined for the block to reconstruct the all-in-focus image.

2. The method of claim 1, further comprising generating a depth map for the all-in-focus image, wherein a depth for a block of the all-in-focus image corresponding to a block of the multi-focus image is a depth corresponding to the best inverse multi-focus PSF determined for the block of the multi-focus image.

3. The method of claim 1, wherein the predetermined inverse multi-focus PSFs are determined offline.

4. An imaging device comprising:
    means for capturing a multi-focus image;
    means for partitioning the multi-focus image into a plurality of blocks;
    means for determining, for each block of the plurality of blocks, a best inverse multi-focus point spread function (PSF) for reconstructing original image intensity values in the block, wherein the best inverse multi-focus PSF is selected from a plurality of predetermined inverse multi-focus PSFs stored in a memory of the imaging device; and
    means for applying to each block of the plurality of blocks the best inverse multi-focus PSF determined for the block to reconstruct the all-in-focus image.

5. The imaging device of claim 4, further comprising means for generating a depth map for the all-in-focus image, wherein a depth for a block of the all-in-focus image corresponding to a block of the multi-focus image is a depth corresponding to the best inverse multi-focus PSF determined for the block of the multi-focus image.

6. The imaging device of claim 4, wherein the predetermined inverse multi-focus PSFs are determined offline.

7. A non-transitory computer readable medium storing instructions that, when executed by at least one processor in an imaging device, cause the execution of a method for all-in-focus image reconstruction and depth map generation in the imaging device, the method comprising:
    capturing a multi-focus image by the imaging device;
    partitioning the multi-focus image into a plurality of blocks;
    determining, for each block of the plurality of blocks, a best inverse multi-focus point spread function (PSF) for reconstructing original image intensity values in the block, wherein the best inverse multi-focus PSF is selected from a plurality of predetermined inverse multi-focus PSFs stored in a memory of the imaging device; and
    applying to each block of the plurality of blocks the best inverse multi-focus PSF determined for the block to reconstruct the all-in-focus image.

8. The non-transitory computer readable medium of claim 7, the method further comprising generating a depth map for the all-in-focus image, wherein a depth for a block of the all-in-focus image corresponding to a block of the multi-focus image is a depth corresponding to the best inverse multi-focus PSF determined for the block of the multi-focus image.

9. The non-transitory computer readable medium of claim 7, wherein the predetermined inverse multi-focus PSFs are determined offline.

* * * * *